C. S. SHARP.
DISK HARROW.
APPLICATION FILED MAR. 17, 1915.
1,206,930.
Patented Dec. 5, 1916.
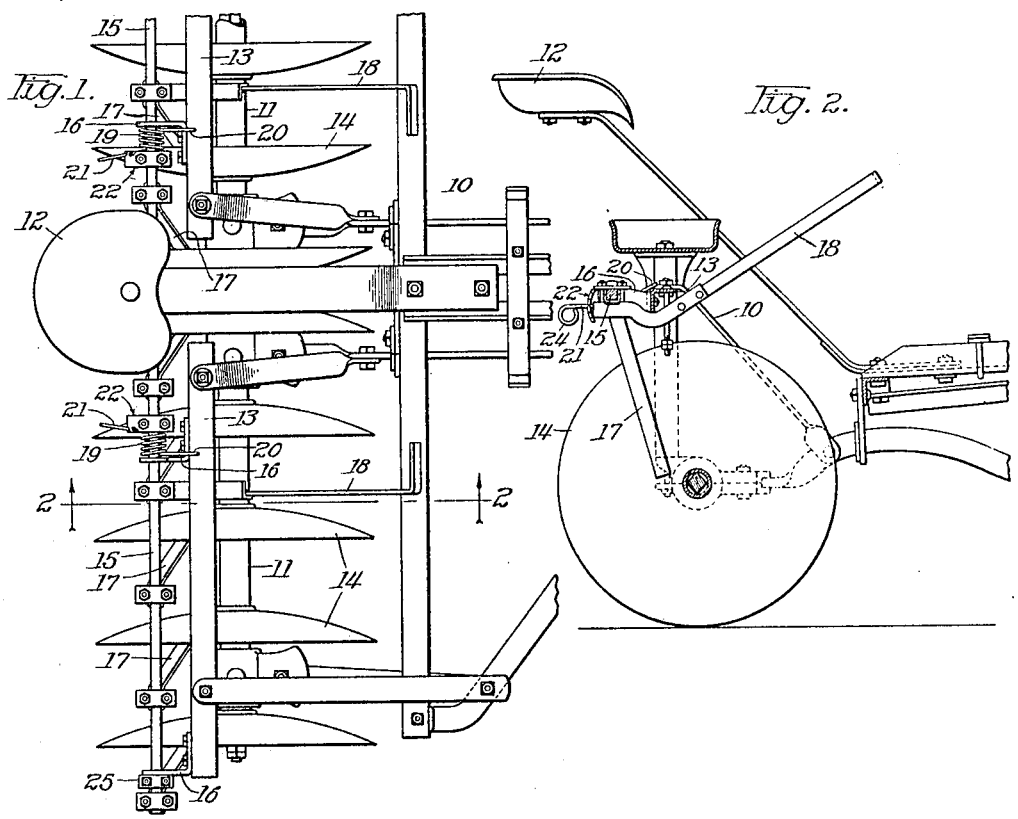
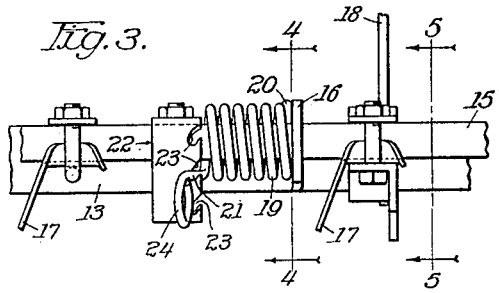
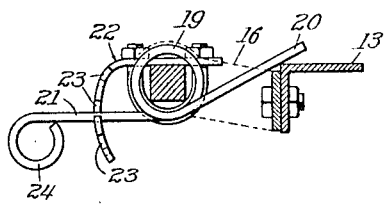
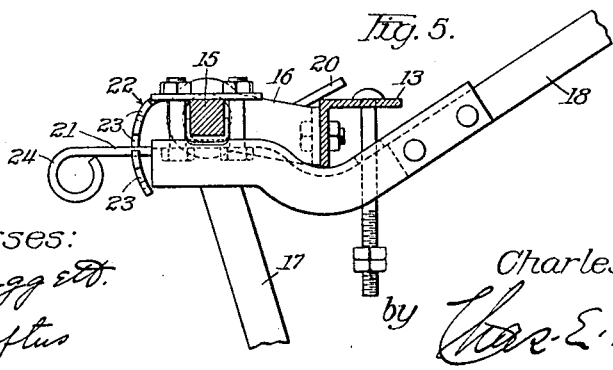
Witnesses:
J. N. Daggett
W. A. Loftus
Inventor
Charles S. Sharp.
by Chas. E. Lord Atty.

UNITED STATES PATENT OFFICE.

CHARLES S. SHARP, OF AUBURN, NEW YORK, ASSIGNOR TO INTERNATIONAL HARVESTER COMPANY OF NEW JERSEY, A CORPORATION OF NEW JERSEY.

DISK HARROW.

1,206,930.  Specification of Letters Patent.  Patented Dec. 5, 1916.

Application filed March 17, 1915. Serial No. 14,906.

*To all whom it may concern:*

Be it known that I, CHARLES S. SHARP, a citizen of the United States, residing at Auburn, in the county of Cayuga and State of New York, have invented certain new and useful Improvements in Disk Harrows, of which the following is a full, clear, and exact specification.

This invention relates to disk harrows, and has for its object to simplify and improve the construction and operation of the disk scrapers employed therein.

The particular type of scraper concerned in the present invention is the rocking bar scraper. Heretofore in the construction of such devices springs or other yielding means have been provided to maintain the scrapers normally in position near the centers of the disks. The spring or yielding means has not been made adjustable, so that in many cases, where the pressure of the scrapers against the surfaces of the disks is great, the spring fails to return the scrapers to their normal position after they have been moved to the peripheries of the disks by the operator. Moreover, provision for adjusting the torsion of the spring or the tension of the yielding means has not been provided to offset the wear or fatigue of the metal.

My present invention contemplates the employment of manually operable means for readily adjusting the tension of the yielding means used to return the scrapers to their normal or inoperative position.

One form which my invention may assume in practice is exemplified in the following description and illustrated in the accompanying drawing, in which—

Figure 1 shows a plan view of a disk harrow provided with a scraper attachment embodying my invention; Fig. 2 shows a vertical sectional view taken on the line 2—2 of Fig. 1; Fig. 3 shows a detail view in rear elevation of a portion of a scraper bar and spring actuating means constructed in accordance with my invention; Fig. 4 shows a vertical cross sectional view taken on the line 4—4 of Fig. 3; and Fig. 5 shows a similar view taken on the line 5—5 of Fig. 3.

Referring more in detail to the accompanying drawing, it will be seen that I have illustrated a disk harrow of well-known construction, comprising a frame 10, pivoted gangs 11, and an operator's seat 12. Each of the gangs, as will be seen, includes a frame 13 and disks 14.

The scraper attachment comprises a rocker bar 15, preferably of rectangular form in cross section, carried longitudinally on the disk gang in bearings 16 secured to the frame 13. As will be seen, a separate rocker bar is provided for each of the gangs. Secured to each of the rocker bars in non-rotatable position is a series of spring-metal scrapers 17, one for each of the disks 14, and when in normal position these scrapers project inwardly, with their free ends adjacent to the centers of the disks. A foot lever 18 is secured to each of the rocker bars and projects forwardly, terminating at a point accessible to the operator, and when this foot lever is depressed the associated rocker bar is turned on its axis to position where the scrapers connected therewith will be moved to the peripheries of the disks. Yielding means is provided for returning the scrapers to inoperative position, and takes the form of a torsional spring 19 coiled about the rocker bar, with one end 20 engaging the frame 13 of the gang and the opposite end 21 connected to the rocker bar. The connection between the end 21 and the rocker bar is by means of a rearwardly and downwardly curved bar 22. This bar 22 is provided with a series of notches 23, in any one of which the end 21 of the spring is adapted to enter, and on this end of the spring I preferably provide a hook 24, or other convenient grip which the operator may grasp to move the end of the spring from one notch to the other.

Obviously, when the projecting end of the spring engages the lowermost notch the torsional strain of the spring is weakened, and when the end is raised to the uppermost notch the spring is placed under its greatest tension. In this way a desirable tension may be maintained on the spring, which will insure quick and certain return of the scrapers when the foot lever has been depressed and released. As the spring wears and thereby becomes weaker, adjustment may be readily made to allow for this.

In the operation of scraper devices it is desirable to vary the pressure between the scrapers and disks, and in the present instance this is accomplished by means of an adjustable clamp 25 carried on the rocker bar in engagement with one of the bearings 16. This clamp being movable longitudinally on the rocker bar obviously provides a positive means for adjusting the pressure of the spring 19, and thereby may be varied the extent of frictional engagement of the scrapers and disks. In sticky soil it is found desirable to have the scrapers engage the disks the full distance of their radii, and when so adjusted greater force is necessary to return these scrapers to the centers of the disks. In this case to have the torsion of the spring 19 readily adjustable is a great convenience and advantage.

I have so arranged the springs 19 and the means for controlling their tension that they may be operated from the driver's seat. A spring 19 is carried near the inner end of each of the rocker bars. The adjustable end of the spring projects rearwardly and, as will be noted, can easily be reached from the driver's seat, so that when soil conditions change and the disks become caked with mud, the tension of the springs then being insufficient to quickly return the scrapers, the operator has only to reach down, grasp the hook 24, and lift the end of the spring to the next notch on the bar 22 without stopping the progress of his work or dismounting from the harrow.

While I have shown and described but one form of scraper device, it is to be understood, nevertheless, that my invention is susceptible of other modifications and, therefore, many changes may be resorted to without departing from the spirit of the invention as disclosed in the appended claims.

What I claim as my invention, and desire to secure by Letters Patent, is:

1. In a disk harrow, a frame, oppositely directed disk gangs carried by said frame, a seat on said frame between the disk gangs, a rocking scraper bar for each of said gangs, scrapers on said bars to engage with the disks, yielding means on each of the bars for maintaining the scrapers normally in inoperative position, and means accessible from the driver's seat for adjusting the tension of said yielding means.

2. In a disk harrow, a frame, oppositely directed disk gangs carried by said frame, a seat on said frame between the disk gangs, a rocking scraper bar for each of said gangs, scrapers on said bars to engage with the disks, positive means for rocking said bars in one direction, a spring on each of said bars for returning the scrapers to normal position, said springs being located near the inner ends of the rocker bars, and means for adjusting the torsion of said springs, said means being operable from the driver's seat.

3. In a disk harrow, a disk gang, a rocker bar carried in bearings on said disk gang, means on said bar for adjusting it longitudinally in its bearings, foot pressure means for rocking said bar, a coiled spring on said bar for maintaining it normally in position where the scrapers are inoperative, and means carried by the bar for adjusting the torsion of said spring.

4. In a disk harrow, a rocker bar, scrapers carried by said bar to engage with the disks, a coiled spring on said bar having one end anchored to a portion of the harrow frame, and a notched arm carried by said bar to receive the opposite end of said coiled spring and whereby the torsion of the spring may be adjusted.

5. In a disk harrow, a frame carrying a plurality of disks, a rocker bar on said frame, scrapers on said rocker bar to engage with the disks, foot pressure means for rocking said bar to move said scrapers toward the peripheries of the disks, a coiled spring for returning said scrapers carried on said bar with one end engaging the frame, and a notched arm carried by said bar to receive the opposite end of said spring, said last mentioned end of the spring being provided with a hand grip whereby it may be moved to various positions on the notched bar for adjusting the torsion of the spring.

6. In a disk harrow, a rocking scraper bar, scrapers carried on the bar to engage with the disks, a spring spirally wound on said bar for actuating the scrapers in one direction, and independent means whereby the adjustment of the pressure and torsion of said spring may be accomplished.

7. In a disk harrow, a rocking scraper bar, scrapers thereon to engage with the disks, a spring coiled on said bar for forcing the scrapers toward the faces of the disks and operating torsionally to maintain the bar in position normally where the scrapers are near the centers of the disks, and independent means for adjusting the pressure and torsion of said spring.

8. In a disk harrow, a rocking scraper bar, scrapers thereon to engage with the disks, a spring coiled on said bar and operating to force it longitudinally in a direction to hold the scrapers against the faces of the disks and torsionally to maintain the bar in position normally where the scrapers are near the centers of the disks, means for adjusting the bar longitudinally to vary the pressure of the spring, and means for adjusting one end of the spring to vary its torsional strain.

In testimony whereof I affix my signature, in the presence of two witnesses.

CHARLES S. SHARP.

Witnesses:
C. W. EMBODY,
R. A. MARLAND.